A. CUNNINGHAM.
Cork for Milk-Jar.
No. 217,072.   Patented July 1, 1879.
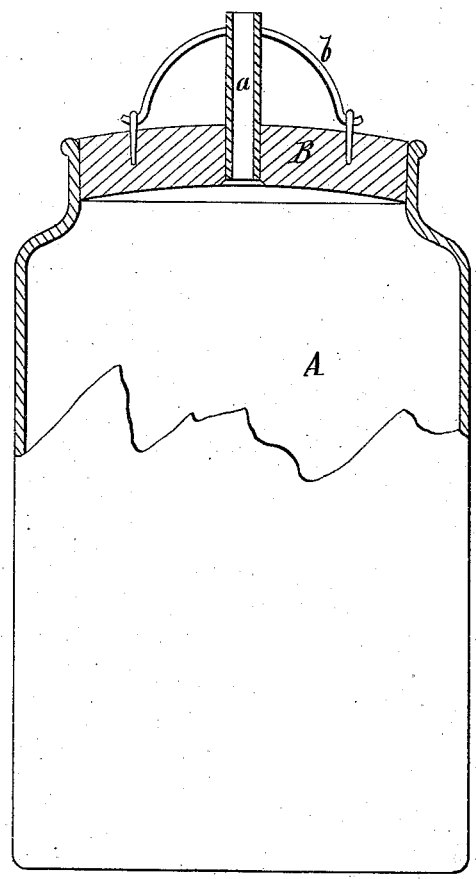
WITNESSES:
INVENTOR:

UNITED STATES PATENT OFFICE.

ALEXANDER CUNNINGHAM, OF AUGUSTA, OHIO.

IMPROVEMENT IN CORKS FOR MILK-JARS.

Specification forming part of Letters Patent No. 217,072, dated July 1, 1879; application filed April 21, 1879.

*To all whom it may concern:*

Be it known that I, ALEXANDER CUNNINGHAM, of Augusta, in the county of Carroll and State of Ohio, have invented a new and Improved Cork for Milk-Jars, of which the following is a specification.

The object of my invention is to furnish an improved cork or stopper for use in connection with jars or cans in which milk is placed at the dairy for delivery to consumers unopened, which cork can readily be removed from the jar, and which will permit the jars to be entirely filled, and the milk cooled by submersion in water.

My invention consists of an elastic cork having a convex under surface, and provided with a rubber tube, fitted in an aperture in the said cork, and with a bail, as hereinafter more fully described.

In the accompanying drawing I have represented, by vertical section, a jar fitted with my improved cork.

A represents a jar, of glass or other material, adapted for holding one or more quarts of milk, as may be desired by the consumer. B is the cork or stopper, inserted in the mouth of the jar. The cork B is made from rubber or other elastic material, so that when pressed to place it will be held by its elasticity, and it is preferably constructed in convex form.

In an aperture at the center of cork B is attached a short tube, *a*, of india-rubber, which projects above the cork, and it should be stiff enough to remain upright.

A bail, *b*, is attached upon the cork, for use in withdrawing the cork from the bottle, can, or jar.

The jars are filled with fresh milk and inserted into ice-water to remove the animal heat and bring the milk as near freezing-point as possible.

With the described cork the jars can be filled and any overflow will pass into tube *a*, and the jar then submerged with the tube only projecting above the water. As the milk shrinks in cooling it falls in the tube, and more may be supplied, if required. After cooling the tube is tied, or the opening closed by bending the tube down.

The advantages resulting from the use of this cork are as follows: The milk may be placed in the jars when fresh and before the cream rises. The jars can be entirely filled, and churning during transportation thereby prevented. The milk is sealed tightly from exposure until it reaches the consumer.

The convexity of the cork gives opportunity for all air to escape in filling, and any pressure on the cork during transportation serves to close it tighter.

The tube *a* may be a separate piece attached in place or be molded with the cork.

Having thus described my invention, I claim as new and desire to secure by Letters Patent—

The herein-described stopper for milk jars or cans, consisting of the elastic cork B, having a convex under surface, and provided with a rubber tube, *a*, fitted in an aperture in the said cork, and with a bail, *b*, substantially as and for the purpose set forth.

ALEXANDER CUNNINGHAM.

Witnesses:
LEVI D. PENNOCK,
SUTTON CUNNINGHAM,
CORWIN IDEN.